(12) United States Patent
Medvinsky (10) Patent No.: US 7,352,867 B2
(45) Date of Patent: Apr. 1, 2008

(54) METHOD OF PREVENTING UNAUTHORIZED DISTRIBUTION AND USE OF ELECTRONIC KEYS USING A KEY SEED

(75) Inventor: Alexander Medvinsky, San Diego, CA (US)

(73) Assignee: General Instrument Corporation, Horsham, PA (US)

( * ) Notice: Subject to any disclaimer, the term of this patent is extended or adjusted under 35 U.S.C. 154(b) by 544 days.

(21) Appl. No.: 10/192,920

(22) Filed: Jul. 10, 2002

(65) Prior Publication Data

US 2004/0008846 A1   Jan. 15, 2004

(51) Int. Cl.
*H04L 9/00* (2006.01)
(52) U.S. Cl. ........................ 380/278; 713/171
(58) Field of Classification Search ........... 380/278; 713/171
See application file for complete search history.

(56) References Cited

U.S. PATENT DOCUMENTS

| | | | | |
|---|---|---|---|---|
| 4,634,808 A | * | 1/1987 | Moerder | 380/29 |
| 5,265,164 A | * | 11/1993 | Matyas et al. | 380/30 |
| 5,497,421 A | * | 3/1996 | Kaufman et al. | 713/156 |
| 5,598,473 A | * | 1/1997 | Linsker et al. | 380/246 |
| 5,680,455 A | * | 10/1997 | Linsker et al. | 380/246 |
| 5,701,343 A | * | 12/1997 | Takashima et al. | 705/51 |
| 5,727,065 A | * | 3/1998 | Dillon | 705/52 |
| 5,809,495 A | * | 9/1998 | Loaiza | 707/2 |
| 5,872,849 A | * | 2/1999 | Sudia | 713/175 |
| 5,926,549 A | * | 7/1999 | Pinkas | 713/168 |
| 5,963,646 A | * | 10/1999 | Fielder et al. | 380/259 |
| 6,002,768 A | * | 12/1999 | Albanese et al. | 713/175 |
| 6,009,177 A | * | 12/1999 | Sudia | 713/191 |
| 6,028,933 A | * | 2/2000 | Heer et al. | 713/169 |
| 6,049,612 A | * | 4/2000 | Fielder et al. | 380/44 |
| 6,058,383 A | * | 5/2000 | Narasimhalu et al. | 705/44 |
| 6,085,320 A | * | 7/2000 | Kaliski, Jr. | 713/168 |
| 6,119,227 A | * | 9/2000 | Mao | 713/171 |
| 6,122,742 A | * | 9/2000 | Young et al. | 726/10 |
| 6,167,518 A | * | 12/2000 | Padgett et al. | 713/186 |
| 6,185,682 B1 | * | 2/2001 | Tang | 713/168 |
| 6,189,098 B1 | * | 2/2001 | Kaliski, Jr. | 713/168 |

(Continued)

FOREIGN PATENT DOCUMENTS

GB    2355905 A    8/2001

OTHER PUBLICATIONS

Shamir A: "Identity-Based Cryptosystems and Signature Schemes" Lecture Notes in Computer Science, Springer Verlag, New York, NY, US, 1985, pp. 47-53, XP000675444, ISSN: 0302-9743, p. 47-p. 48, line 26.

(Continued)

*Primary Examiner*—Nasser Moazzami
*Assistant Examiner*—David Garcia Cervetti
(74) *Attorney, Agent, or Firm*—Stewart M. Wiener (57) ABSTRACT

A method and system for generating an electronic key used in an electronic transaction can be created by executing a one-way function on a host that derives the electronic key from a key seed saved in a non-volatile storage unit of the host and a unique host identification that is resident on the host. The function is preferably executed each time an electronic transaction requiring the use of the electronic key is made.

21 Claims, 6 Drawing Sheets

U.S. PATENT DOCUMENTS

| | | | |
|---|---|---|---|
| 6,195,432 B1* | 2/2001 | Takahashi et al. | 380/277 |
| 6,202,150 B1* | 3/2001 | Young et al. | 713/167 |
| 6,230,269 B1* | 5/2001 | Spies et al. | 713/182 |
| 6,240,513 B1* | 5/2001 | Friedman et al. | 713/152 |
| 6,243,466 B1* | 6/2001 | Young et al. | 380/28 |
| 6,253,322 B1* | 6/2001 | Susaki et al. | 713/170 |
| 6,263,437 B1* | 7/2001 | Liao et al. | 713/169 |
| 6,282,295 B1* | 8/2001 | Young et al. | 380/286 |
| 6,337,911 B1* | 1/2002 | Dillon | 380/262 |
| 6,370,249 B1* | 4/2002 | Van Oorschot | 380/277 |
| 6,389,136 B1* | 5/2002 | Young et al. | 380/28 |
| 6,389,402 B1* | 5/2002 | Ginter et al. | 705/51 |
| 6,473,508 B1* | 10/2002 | Young et al. | 380/30 |
| 6,487,661 B2* | 11/2002 | Vanstone et al. | 713/171 |
| 6,600,823 B1* | 7/2003 | Hayosh | 380/51 |
| 6,629,243 B1* | 9/2003 | Kleinman et al. | 713/163 |
| 6,681,017 B1* | 1/2004 | Matias et al. | 380/277 |
| 6,685,562 B1* | 2/2004 | Rantanen | 463/17 |
| 6,728,878 B2* | 4/2004 | Dillon | 713/160 |
| 6,766,306 B1* | 7/2004 | Matsuyama | 705/53 |
| 6,772,340 B1* | 8/2004 | Peinado et al. | 713/168 |
| 6,775,771 B1* | 8/2004 | Shrader et al. | 713/167 |
| 6,819,766 B1* | 11/2004 | Weidong | 380/277 |
| 6,842,523 B1* | 1/2005 | Niwa et al. | 380/286 |
| 6,871,206 B2* | 3/2005 | Henry et al. | 708/250 |
| 6,895,504 B1* | 5/2005 | Zhang et al. | 713/175 |
| 6,904,419 B1* | 6/2005 | Pintsov et al. | 705/408 |
| 6,914,985 B1* | 7/2005 | Shrader et al. | 380/30 |
| 6,931,128 B2* | 8/2005 | Roberts | 380/44 |
| 6,996,724 B2* | 2/2006 | Murakami et al. | 713/193 |
| 2002/0001387 A1* | 1/2002 | Dillon | 380/262 |
| 2002/0118836 A1* | 8/2002 | Howard et al. | 380/262 |
| 2002/0133607 A1* | 9/2002 | Nikander | 709/229 |
| 2002/0196935 A1* | 12/2002 | Wenocur et al. | 380/37 |
| 2003/0063752 A1* | 4/2003 | Medvinsky et al. | 380/279 |
| 2003/0076955 A1* | 4/2003 | Alve et al. | 380/201 |
| 2003/0095664 A1* | 5/2003 | Asano et al. | 380/277 |
| 2003/0123667 A1* | 7/2003 | Weber et al. | 380/277 |
| 2003/0133576 A1* | 7/2003 | Grumiaux | 380/279 |

OTHER PUBLICATIONS

Bruce Schneier: "applied cryptography, second edition" 1996, John Wiley & Sons, New York, NY, US, XP002265704, p. 115.

* cited by examiner

METHOD OF PREVENTING UNAUTHORIZED DISTRIBUTION AND USE OF ELECTRONIC KEYS USING A KEY SEED

FIELD OF THE INVENTION

The present invention relates to the field of electronic interaction cryptology. More specifically, the present invention relates to the field of electronic interactions that require the use of electronic keys.

BACKGROUND OF THE INVENTION

Every day hundreds of thousands of people interact electronically. For example, people use electronic mail (e-mail) to correspond with one another and to send information. People and businesses rely heavily on networks of computers or other electronic devices to manage, protect, and transfer important information. Millions of dollars are electronically transferred daily via bank networks and automatic teller machines (ATMs). People use cellular phones and other wireless personal digital assistants (PDAs) to communicate and transfer information on a daily basis.

The advent of the Internet, comprised of millions of interconnected computers, has accelerated electronic interaction dramatically. The Internet allows nearly instantaneous communication and transfer of information to virtually anywhere in the world. The World Wide Web (www) is used for online business, data distribution, marketing, stock exchange, online banking, gaming, research, learning, and a myriad of other activities.

When parties interact face to face or by using a physical medium such as paper, it is relatively easy to authenticate the credentials of those who are interacting. For example, if a person walks into a bank and tries to make a withdrawal, the bank teller can ask for and verify his or her identification before giving the requested funds. A person's signature on a contract is considered sufficient to guarantee his or her approval of the contract. Likewise, if a person goes into a store and buys an item with a credit card, it is easy for a cashier to take precautions so as to be reasonably sure that the person is the true owner of that credit card.

However, in the realm of electronic interaction, such physical means of authentication cannot be used. People and businesses will not transfer funds, buy an item over the Internet, or otherwise manage and transfer confidential information using any electronic device unless they feel that their electronic interactions are secure and safe. Thus, in a world where decisions and agreements are communicated electronically, electronic techniques for providing authentication, security, and privacy are needed.

Cryptography is the study of techniques and applications that can be used to protect sensitive information, maintain privacy in communications, authenticate users in transactions, and perform other security measures in information transfer. Cryptanalysis is the study of how to compromise, or defeat, cryptographic mechanisms. A hacker, for example, is a person who studies and practices cryptanalysis. Cryptology is the discipline of cryptography and cryptanalysis combined.

Cryptography allows people to carry over the confidence found in the physical world to the electronic world, thus allowing people to do business electronically without undue worries of deceit, breaches in privacy, or lack of security. The perpetual increase of information transmitted electronically has led to an increased reliance on cryptography.

For example, cryptography techniques help make web sites secure and electronic transmissions safe. This allows people to do online banking, online trading, and make online purchases with their credit cards without worrying that their account information is being compromised. Cryptography is very important to the continued growth of the Internet and electronic commerce.

Cryptography is also used in phones, televisions, and a variety of other common household items. Without cryptography, hackers could much more readily access someone else's private e-mail, listen in on phone conversations, tap into cable companies and acquire free cable service, or break into bank accounts.

A major emphasis in cryptography includes encryption and decryption. Encryption is the transformation of data into a form that is apparently unintelligible and extremely difficult, if not impossible to access in a reasonable amount of time without the appropriate knowledge, e.g., a key. Keys will be explained further below. Encryption's purpose is to ensure privacy by keeping information hidden from anyone for whom it is not intended, even those who have access to the encrypted data. Decryption is the reverse of encryption; it is the transformation of encrypted data back into an intelligible form. For a web site to be secure, for example, all of the data transmitted between the computers where the data is stored and where it is received must be encrypted. The receiving computers must then be capable of decrypting the data.

While modern cryptography is growing increasingly diverse, cryptography is fundamentally based on problems that are difficult to solve. A problem may be difficult because its solution requires the use of some secret knowledge. A problem may also be difficult because it is intrinsically difficult to complete, such as finding the factors of an extremely large number.

As explained above, successful encryption and decryption depend on some sort of secret knowledge ideally known by only the parties performing the encryption and decryption. This piece of knowledge is referred to as a key. A key is usually a sequence of random or pseudorandom bits. Thus, a person without the right key cannot send, receive, or interpret someone else's sensitive information. Keys are also used for electronic authentication, digital signatures, digital timestamps, and for other electronic security purposes. As used hereafter and in the appended claims, unless otherwise specifically denoted, the term "electronic transaction" will be used to refer expansively to all possible electronic communication that requires the use of one or more keys.

Currently, there are two types of cryptosystems: secret-key and public-key cryptography. In secret-key cryptography, also referred to as symmetric session cryptography, the same key is used for both encryption and decryption. The main challenge of symmetric session cryptography is getting the sender and receiver to agree on the symmetric session key without anyone else discovering the symmetric session key. If they are in separate physical locations, for example, they must trust a courier, a phone system, or some other transmission medium to prevent the disclosure of the symmetric session key. Anyone who overhears or intercepts the key in transit can later read, modify, and forge all messages encrypted or authenticated using that key. The generation, transmission, and storage of keys are called key management. All cryptosystems must deal with key management issues. Because all keys in a symmetric system cryptosystem must preferably remain secret, symmetric session cryptography often has difficulty providing secure key management, especially in open systems with a large number of users.

As a result of the key management issues associated with symmetric session cryptography, public-key cryptography was developed. In public-key cryptography, each user has a public key and a private key. The public key is made public while the private key remains secret. Encryption is performed with the public key while decryption can only be performed with the private key. In public-key cryptography, the need for the sender and receiver to share secret information is eliminated; all communications involve only public keys, and no private key is ever transmitted or shared. Thus, it is not necessary to trust the security of some means of communicating a symmetric session key. Anyone can send a confidential message by just using public information. The message can only be decrypted using a private key, which is in the sole possession of the intended recipient.

One current disadvantage, however, with public-key cryptography is that the private key is linked mathematically to the public key. Therefore, it is possible to attack a public-key system by deriving the private key from the public key. However, this typically requires unreasonably large amounts of time or other resources.

Currently, symmetric session keys and private keys can be stored on the hard drive or other non-volatile storage unit of a user's computer or other electronic device, such as a cable set-top box (STB). The user can then use these keys to securely communicate electronically. However, the storage of keys on a user's computer or other device in the control of the user presents various problems. First, the user can copy a key residing on his or her computer or other device, for example, and distribute the copied key to other people. These people may then be able to assume the user's electronic identity and send or receive information that is intended for use by the original user only. Such situations could occur in cases where a person pays a monthly subscription rate to receive content over the Internet or via a cable television system. If this person distributes the key that allows access to the paid content, multiple users could receive the content without paying for it.

A second problem with storing keys on a user's computer or other electronic device involves tampering and theft. An unauthorized person could copy a user's key if the user accidentally leaves his or her computer or other electronic device unattended or electronically unprotected. This unauthorized person could then send and receive potentially private information intended for the original user.

Thus, there is a need in the art for a method and system of preventing the unauthorized distribution and use of keys, including symmetric session keys and private keys, used in secure electronic communications. As used hereafter and in the appended claims, unless otherwise specifically denoted, the term "key" will be used to refer expansively to all possible electronic communication keys, including symmetric session keys and private keys.

There are several approaches to prevent unauthorized distribution and use of keys. One approach is to use fraud management. Fraud management is the detection of multiple active hosts who have assumed the same identity. A host could be a computer that is connected to the Internet, for example, or a STB connected to a cable network. As used hereafter and in the appended claims, unless otherwise specifically denoted, the term "host" will be used to refer expansively to any electronic device used by a user to communicate electronically.

There are several disadvantages of fraud management. First, fraud management detects fraud after the fraud has already occurred and does little to prevent the illegal use of keys from happening in the first place. Fraud management also requires additional cost and overhead and is not foolproof.

Another protection against the illegal distribution and use of keys is the use of a tamper-resistant key storage device that would make it preferably infeasible for a hacker to extract and then copy keys. The device preferably destroys its contents if ever opened and shields against attacks using electromagnetic radiation. There are many possible designs for tamper-resistant key storage, including key-containing hosts that are activated by the use of a special physical key or by the detection of a unique physical trait of an authorized user.

However, it is not currently economically viable to require that every user who wants to send and receive sensitive information have a tamper-resistant key storage device. Thus, this protection method is not preferable for large numbers of users.

The fact is that no security measure to combat unauthorized distribution and use of keys is completely foolproof. This is generally accepted in the field of cryptology. Thus, implementing more than one security measure to prevent unauthorized key distribution and use would provide better protection than would using only one method of security.

SUMMARY OF THE INVENTION

In one of many possible embodiments, the present invention provides a method of generating an electronic key used in an electronic transaction. The method comprises executing a one-way function on a host that derives the electronic key from a key seed saved in a non-volatile storage unit of the host and a unique host identification that is resident on the host. The function is preferably executed each time an electronic transaction requiring the use of the electronic key is made.

Another embodiment of the present invention provides a system for generating an electronic key used in an electronic transaction. The system comprises a host that has a unique host identification resident on the host for making the electronic transaction, a non-volatile storage unit of the host for storing a key seed, and a one-way function for deriving the electronic key from the key seed and the host identification. The host preferably executes the one-way function each time an electronic transaction requiring the use of the electronic key is made.

Additional advantages and novel features of the invention will be set forth in the description which follows or may be learned by those skilled in the art through reading these materials or practicing the invention. The advantages of the invention may be achieved through the means recited in the attached claims.

BRIEF DESCRIPTION OF THE DRAWINGS

The accompanying drawings illustrate preferred embodiments of the present invention and are a part of the specification. Together with the following description, the drawings demonstrate and explain the principles of the present invention. The illustrated embodiments are examples of the present invention and do not limit the scope of the invention.

Throughout the drawings, identical reference numbers designate similar, but not necessarily identical, elements.

DESCRIPTION OF THE PREFERRED EMBODIMENTS

The present invention provides a method and system whereby a host saves a key seed instead of a key in a non-volatile storage unit. The key seed will be explained in more detail below in connection with FIG. 4. To obtain a desired key, a user runs a one-way function on the host using the key seed and a host identification (host ID) as inputs to the function. Thus the one-way function only generates a valid key on the host for which the use of the key is intended. Because the key itself is not stored in the non-volatile storage unit of the host, the key cannot be copied and distributed to other hosts. Another advantage of the present invention is its relatively low economic cost of implementation.

Using the drawings, the preferred embodiments of the present invention will now be explained.

Figure 1:
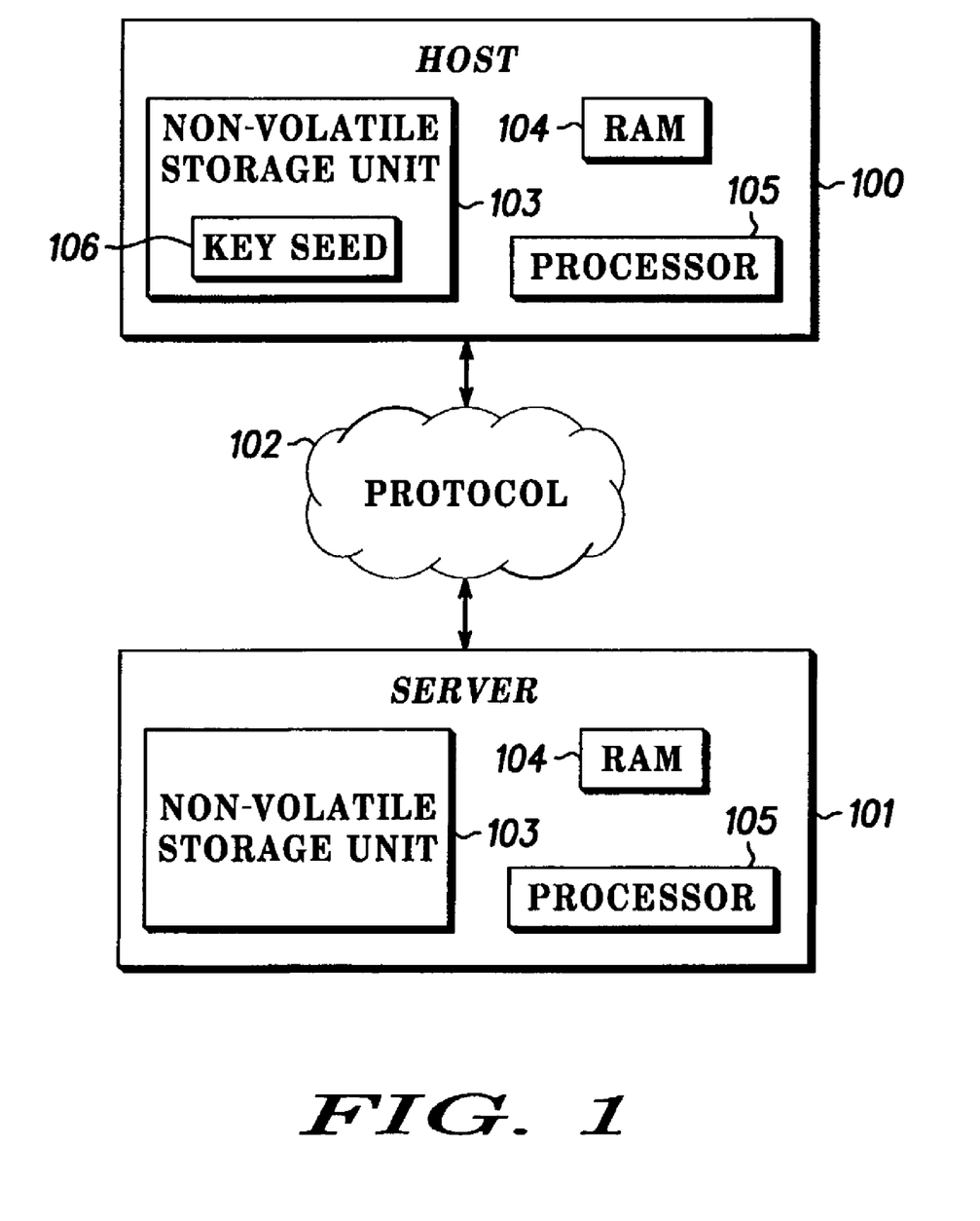
FIG. 1 is a block diagram of an exemplary electronic interaction configuration that could be used to implement an embodiment of the present invention.

FIG. 1 is a block diagram of an exemplary electronic interaction configuration that could be used to implement an embodiment of the present invention. As shown in FIG. 1, a host (100) is used by a client, or user, desiring to electronically interact with a server (101). The host (100) can be a personal computer, server, automatic teller machine (ATM), cellular phone, cable or satellite set-top box (STB) or any other electronic device capable of electronic communication. The server (101) can also be a personal computer, server, ATM, cellular phone, cable headend or any other electronic device capable of electronic communication. As used hereafter and in the appended claims, unless otherwise specifically denoted, the term "host" will be used to refer expansively to all possible electronic communication devices used by a client and the term "server" will be used to refer expansively to all possible electronic communication devices with which the client desires to communicate.

As shown in FIG. 1, the host (100) preferably contains a non-volatile storage unit (103) designed to function with or within the host (100). The non-volatile storage unit (103), as referred to hereafter and in the appended claims, can be, for example, a hard drive, floppy disk, compact disk (CD), flash memory unit, or any other storage unit (103) capable of non-volatile storage. According to an embodiment of the present invention and as shown in FIG. 1, a key seed (106) can be stored in the non-volatile storage unit (103).

The host (100) also preferably contains random access memory (RAM) (104) for temporary storage of information. The RAM (104) could temporarily store a key generated by the function, for example. The host also preferably contains a processor (105), such as a CPU for example, for running the function that generates a key.

As shown in FIG. 1, the server (101) could also have a non-volatile storage unit (103), RAM (104), and a processor (105) that could be used in completing an electronic transaction with the host (100).

Because the host (100) and the server (101) can be different systems, a protocol (102) is used to facilitate electronic communication between the host (100) and the server (101), as shown in FIG. 1. A protocol (102) is a formal set of conventions governing the format and control of interaction among electronic communication devices. In other words, a protocol (102) is a method and system by which two dissimilar or non-identical electronic systems can communicate.

In the field of cryptology, there are a number of different protocols (102) that can be used to ensure security and privacy in the exchange of information between the host (100) and the server (101). Where the exchange is based on a key or keys, these protocols (102) that are used to ensure security and privacy in the exchange of information between electronic devices may be referred to as key management protocols (102). Examples of possible key management protocols (102) that are currently in use are Kerberos, DOCSIS® Baseline Privacy Interface+ (DOCSIS, an acronym for Data Over Cable Service Interface Specification, is a registered trademark of Cable Television Laboratories, Inc.), and Internet Key Exchange (IKE). The present invention can be implemented using any of these protocols (102) or any other protocol (102) that involves storing a key on a nonvolatile storage unit. in the case of public-key cryptography, the present invention can be implemented using protocols (102) that allow for the private key seed to be randomly generated and for the public key to be derived from the private key.

Figure 2:
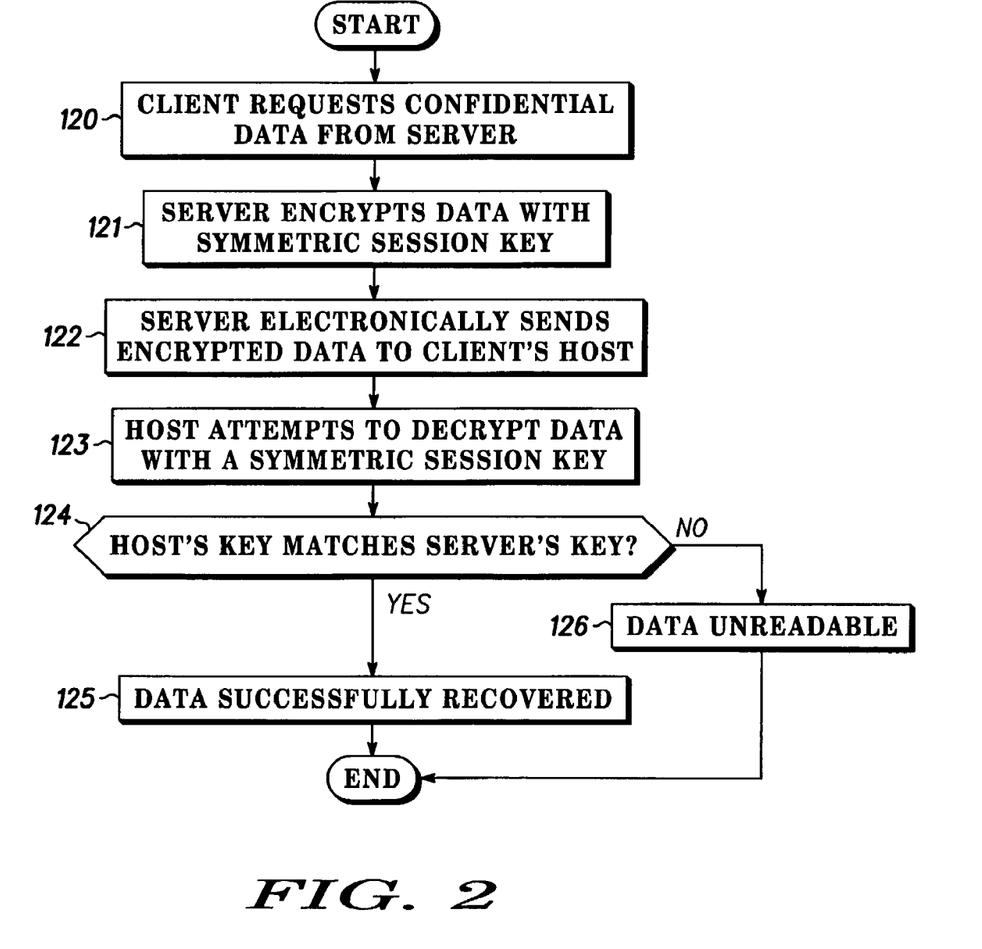
FIG. 2 is a flow chart illustrating an exemplary method of symmetric session cryptography with which the present invention can be implemented.

FIG. 2 is a flow chart illustrating an exemplary method of symmetric session cryptography with which the present invention can be implemented. Although the method of FIG. 2 illustrates the encryption and decryption of confidential data, this method can be applied to any other type of electronic transaction using symmetric session cryptology.

As shown in FIG. 2, the process begins with a client requesting confidential data from a server (120). This request can be performed in a variety of ways including, but not limited to, selecting an option on a web page, sending e-mail, transmitting a request from a STB, making a phone call, or sending a letter on paper.

After the request for confidential data has been made, the server encrypts the data to be sent to the client using a symmetric session key (121). The server then electronically sends the encrypted data to the client's host (122).

Once the client's host receives the encrypted data, it attempts to decrypt the encrypted data using a key (123). Successful decryption depends on the key that the host uses to decrypt the data. In a symmetric session cryptosystem, the host will use a key that is identical to the key used by the server to encrypt the data. Thus, if the host's key matches the key used by the server (124), successful decryption and recovery of the requested data (125) is possible. However, if a host does not have or use a key to decrypt the encrypted data that is identical to the key used by the server, the encrypted data cannot be decrypted and is unreadable (126).

Figure 3:
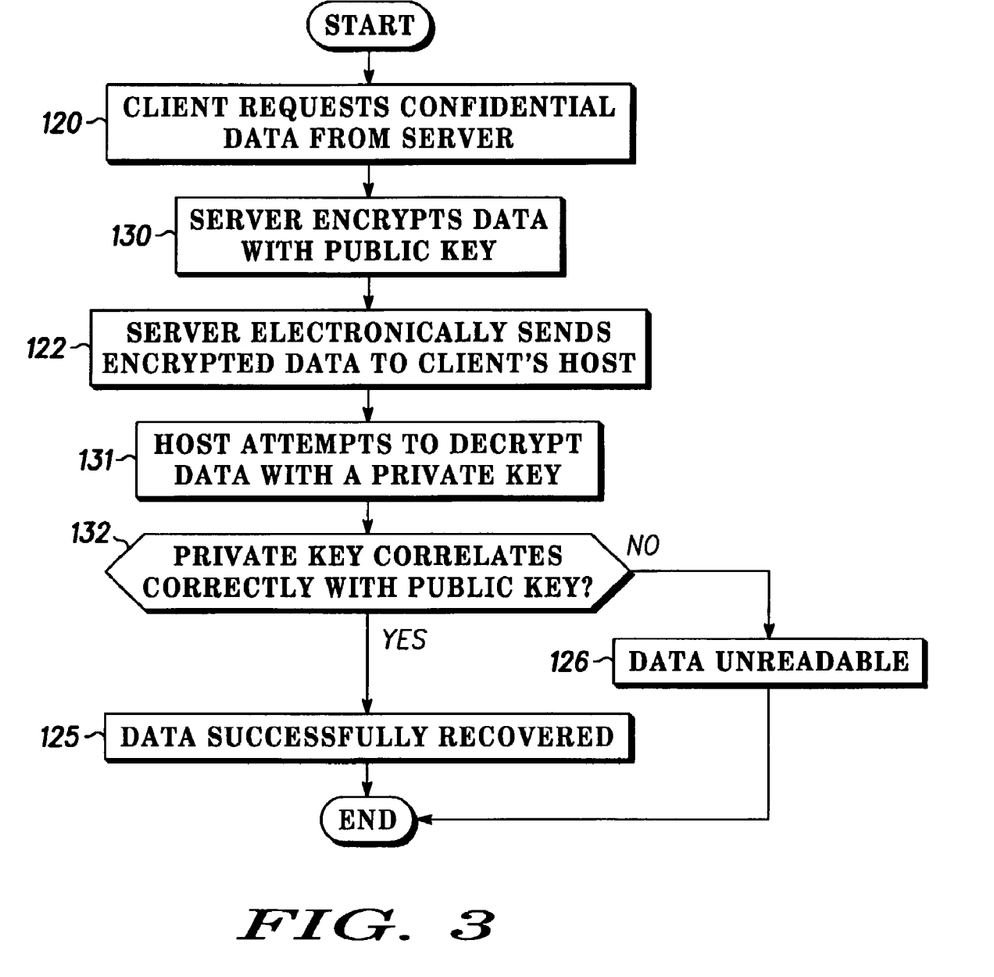
FIG. 3 is a flow chart illustrating an exemplary method of public-key cryptography with which the present invention can be implemented.

FIG. 3 is a flow chart illustrating an exemplary method of public-key cryptography with which the present invention can be implemented. Although the method of FIG. 3 illustrates the encryption and decryption of confidential data, this method can be applied to any other type of electronic transaction using public-key cryptology.

As shown in FIG. 3, the process begins with a client requesting confidential data from a server (120). This request can be performed in a variety of ways including, but not limited to, selecting an option on a web page, sending e-mail, transmitting a request from a STB, making a phone call, or sending a letter on paper.

After the request for confidential data has been made, the server encrypts the data to be sent to the client using a public key (130) associated with the client requesting the confidential data. The server then electronically sends the encrypted data to the client's host (122).

Once the client's host receives the encrypted data, it attempts to decrypt the encrypted data using a private key that corresponds to the public key used to encrypt the confidential data (131). Successful decryption depends on the private key that the host uses to decrypt the data. In a public-key cryptosystem, the host uses a private key that is mathematically related to the public key used by the server to encrypt the data. Thus, if the host's private key is correctly correlated to the public key used by the server (132), successful decryption and recovery of the requested data (125) is possible. However, if a host does not have or use the correct private key to decrypt the encrypted data, the encrypted data is preferably not capable of being decrypted and is unreadable (126).

Figure 4:
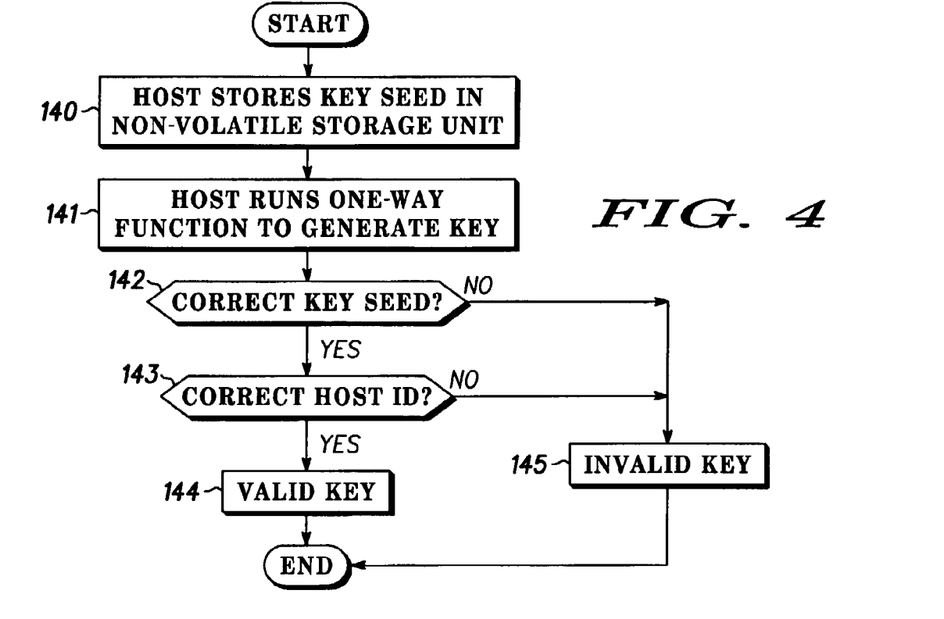
FIG. 4 is a flow chart illustrating a method of the present invention that entails storing a key seed, instead of a key, in a host's non-volatile storage unit and then deriving a key based on the key seed and the host's unique identification.

However, as noted above, if a symmetric session key for a symmetric cryptosystem or a private key for a public-key cryptosystem is stored on the host of a user, that user may attempt to share that secret or private key to allow others access to the communications from the server. Additionally, if a symmetric session key for a symmetric cryptosystem or a private key for a public-key cryptosystem is stored on the user's host, someone without the user's consent may find a way to access the user's host and obtain the secret or private key so as to gain access to the confidential data being transmitted from the server to the authorized user. FIG. 4 is a flow chart illustrating a method according to an embodiment of the present invention that entails storing a key seed, instead of a key, in a host's non-volatile storage unit to mitigate the chances that a user's key will be compromised, with or without the user's cooperation. The key needed to decrypt incoming encrypted transmissions can be derived from the key seed. This method will be explained in more detail below using FIG. 4.

As shown in FIG. 4, the process begins with a host preferably storing a key seed in a non-volatile storage unit (140). The key seed is preferably a random bit sequence used to generate another bit sequence. In the present invention, the key seed is used to generate a key, which is also a sequence of bits. The key may be either a symmetric session key used in a symmetric cryptosystem or a private key used in a public-key cryptosystem.

After the key seed has been stored by the host in a non-volatile storage unit, the host then runs a one-way function that generates a key (141) when the key is needed to perform an electronic transaction. The key is preferably not stored in any non-volatile memory unit of the host and consequently, the key is not accessible to the user at any time. Rather, the key might be temporarily stored in random access memory (RAM), for example, which would make it difficult or even impossible for the client or anyone else to copy the key by accessing the client's host.

The one-way function is a function of two inputs—the key seed and a host identification (host ID). The host ID is preferably a permanent and unique identifier resident in the host and is difficult or impossible to change without adversely affecting the operation of the host. Most electronic host devices currently contain a unique electronic host ID that is generated and placed in the host device by its manufacturer. Where this host ID is stored and how it may be accessed will vary depending on the make and model of the host device. However, one of ordinary skill in the art, with the benefit of this disclosure, will be able to identify where the host ID is stored and how it can be accessed for use by an embodiment of the present invention given any particular host device. Alternatively, a host ID may be generated by a dedicated algorithm that bases the host ID on information gathered from the host that defines or describes the hardware and configuration of the host device.

In some embodiments, the one-way function that obtains the host ID and the key seed and then generates the corresponding key can be called using the following general command: Key=KeyGen(Host ID, Key Seed). The command syntax can be modified to fit the language of the desired key management protocol.

A function (F) is said to be one-way if it is hard to invert. In other words, if the result of F is f, it is computationally infeasible to find some input x such that $F(x)=f$, where $F(x)$ means that F is a function of x. In this embodiment of the present invention, the fact that the function that generates the key is one-way means that it is difficult, if not impossible, to derive the key seed from the key. For example, if given the key and a value of a new host ID a hacker could obtain the corresponding new value of the key seed, he or she could possibly derive new key seeds for many unauthorized hosts. These new key seeds could be combined with their corresponding host IDs to generate valid keys that could be used in an electronic transaction. A one-way function, however, makes it computationally infeasible to determine a key seed, given a value of a key and a host ID.

Returning to FIG. 4, if the host has a correct key seed (142) and a correct host ID (143), the function produces a valid key (144) that can be used in electronic communication. However, if either the key seed or the host ID is wrong, the function generates an invalid key (145).

An exemplary application of the key generation process shown in FIG. 4 is the interaction of a client with a web site on the Internet. If, for example, a client orders monthly paid content from website, the website operators can send a key seed and a key-generating function to the client to install on his or her host. The function takes as inputs the client's host ID and the key seed. The host is queried for its ID by the function when needed. If the correct host ID and key seed are not accurately input to the function, the function will not generate a valid key. The client must preferably run this function and use the generated key every time he or she desires to obtain the monthly paid content. Because the function only works with the client's host ID and key seed, it is difficult or impossible to transfer the function to a different host with a different host ID and obtain a valid key when the function is executed. This is because even if the client copies the key seed and function and distributes them to other people, they will not be able to generate a valid key because their host IDs are different than the host ID with which the function is designed to work and provide a valid key.

Figure 5:
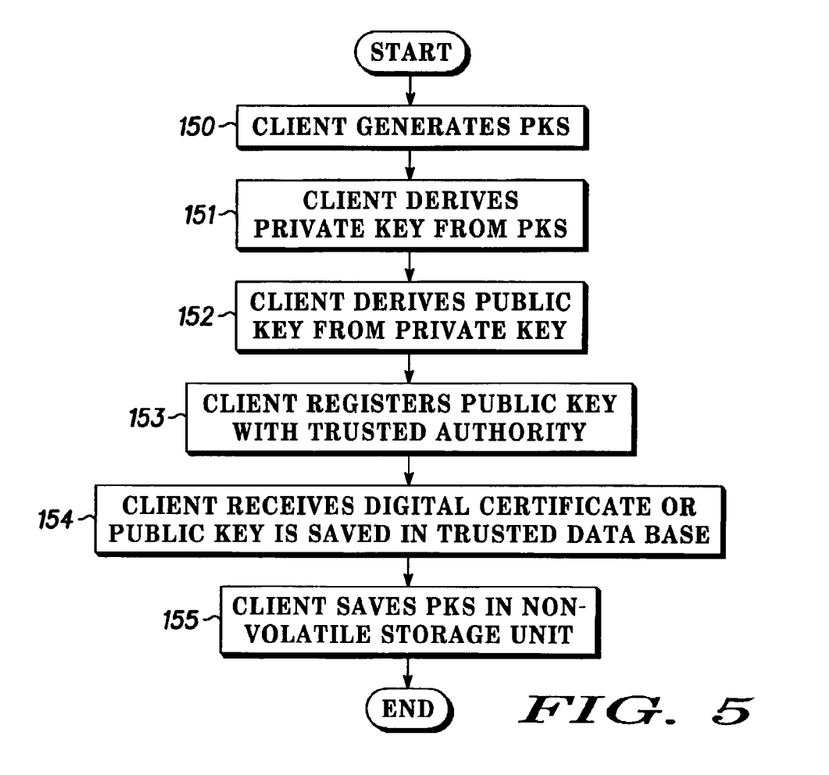
FIG. 5 is a flow chart illustrating an exemplary method of the present invention as applied to public-key cryptography.

FIG. 5 is a flow chart illustrating an exemplary method of the present invention as applied to public-key cryptography. More specifically, FIG. 5 illustrates a method that can be used to initially generate private and public keys with a private key seed (PKS) and then store the PKS on a client's non-volatile storage unit. The client in this embodiment generates his or her own key pair. A key pair preferably consists of a private and public key.

As shown in FIG. 5, a client initially generates a PKS (150) on his or her host. The PKS is preferably randomly generated by the host. The client then derives a private key from the PKS (151) using a one-way function with the PKS and host ID as inputs to the function.

The function can be called using a command found in the chosen key management protocol that employs public-key cryptography. Protocol examples are Kerberos with PKINIT extension that allows support for public-key cryptography, Internet Key Exchange (IKE) and Transport Layer Security (TLS). Examples of public key algorithms that may be used in combination with these functions include Elliptic Curve Digital Signature Algorithm (ECDSA), Elliptic Curve Diffie-Hellman (ECDH) and Elliptic Curve Authenticated Encryption Scheme (ECAES). In the case of Elliptic Curve-based algorithms, the command that generates a private key from a PKS is the following: "Private Key=PKGen(Host ID, PKS) modulo Point-Order". The Point-Order parameter is specific to Elliptic Curve cryptology. Each Elliptic Curve has its own value for the Point-Order parameter.

However, the present invention does not depend on the choice of the PKGen( ) function. The following general command calls the function that generates the private key from the PKS: "Private Key=F(PkGen(Host ID, PKS))", where the function F is dependent on a particular public-key cryptosystem. The function is preferably fast enough to regenerate the private key every time an electronic transaction requires the use of a private key.

Returning to FIG. 5, after the private key is derived from the PKS (151), the client preferably derives a public key from the private key (152). This can be done by using a variety of mathematical functions known to cryptography. The public key is then registered with a trusted authority (153). The trusted authority is usually referred to as a Certifying Authority (CA).

The CA returns to the client a certificate attesting to the validity of the generated public key or stores the public key in a trusted database (154). Certificates are digital documents attesting to the binding of a public key to a client or other entity. Certificates allow verification of the claim that a specific public key does in fact belong to a specific client. They help prevent someone from using a phony key to impersonate someone else.

In their simplest form, certificates contain a public key and a name. A certificate might also contain an expiration date, the name of the CA that issued the certificate, a serial number, the digital signature of the certificate issuer, and perhaps other information.

CAs can be any trusted central administration willing to vouch for the identities of those clients to whom it issues certificates and their association with a given key. For example, a company may issue certificates to its employees, or a university to its students. A Key Distribution Center (KDC) may for example be extended to include the functionality of a CA. KDCs are dedicated to key generation, verification, and distribution.

After the client receives the certificate or the public key is saved in a trusted database (154), as shown in FIG. 5, the client's host saves the randomly generated PKS in a non-volatile storage unit (155). The PKS can now be used to generate the private key that is to be used in future electronic transactions.

Figure 6:
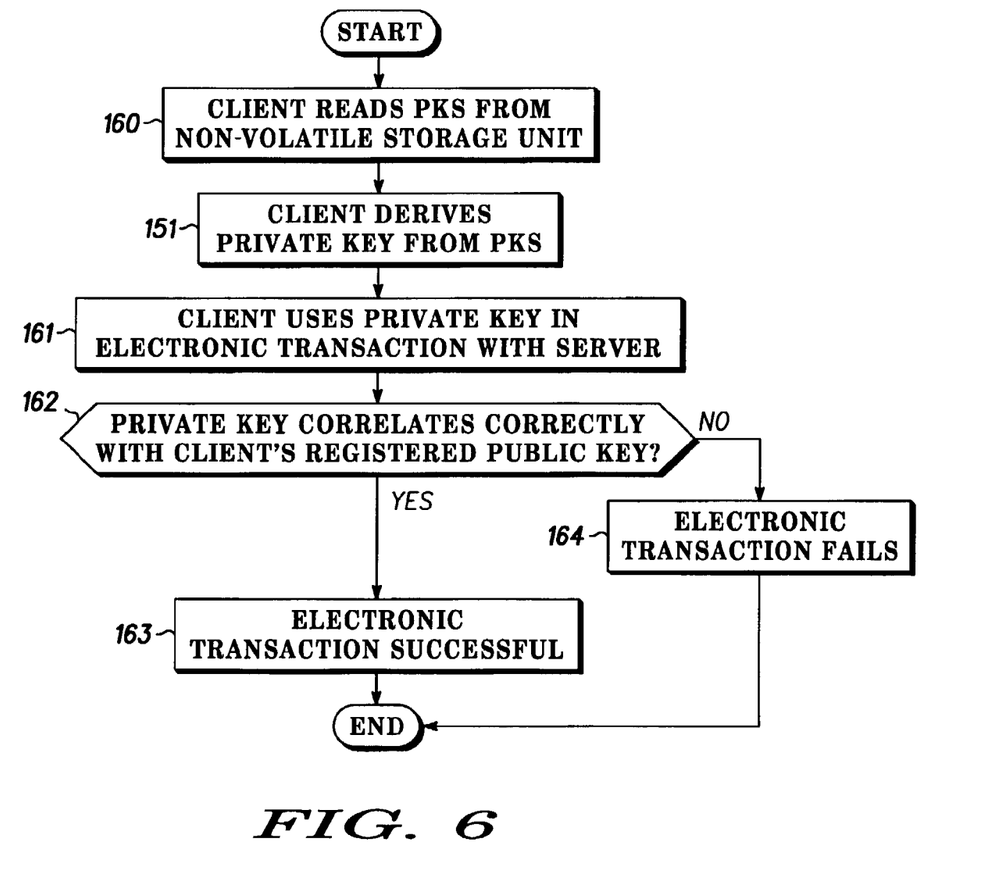
FIG. 6 is a flow chart illustrating a second exemplary method of the present invention as applied to public-key cryptography.

FIG. 6 is a flow chart illustrating a second exemplary method of the present invention as applied to public-key cryptography. More specifically, FIG. 6 illustrates a method whereby a client preferably uses a randomly generated PKS stored in a non-volatile storage unit to generate a private key that he or she can use in an electronic transaction.

As shown in FIG. 6, the process starts with a client's host reading the PKS from a non-volatile storage unit (160). Using the same function that was used to initially generate the private key, which was used to generate the public key (explained in connection with FIG. 5), the client derives the same private key based on the stored PKS (151).

The client can now preferably use the private key in an electronic transaction (161). If, as shown in FIG. 6, the private key correlates correctly with the registered public key (162), the server and client can use the private and public key pair to complete the electronic transaction (163). On the other hand, if the private key does not correlate correctly with the registered public key, the electronic transaction fails (164).

Figure 7:
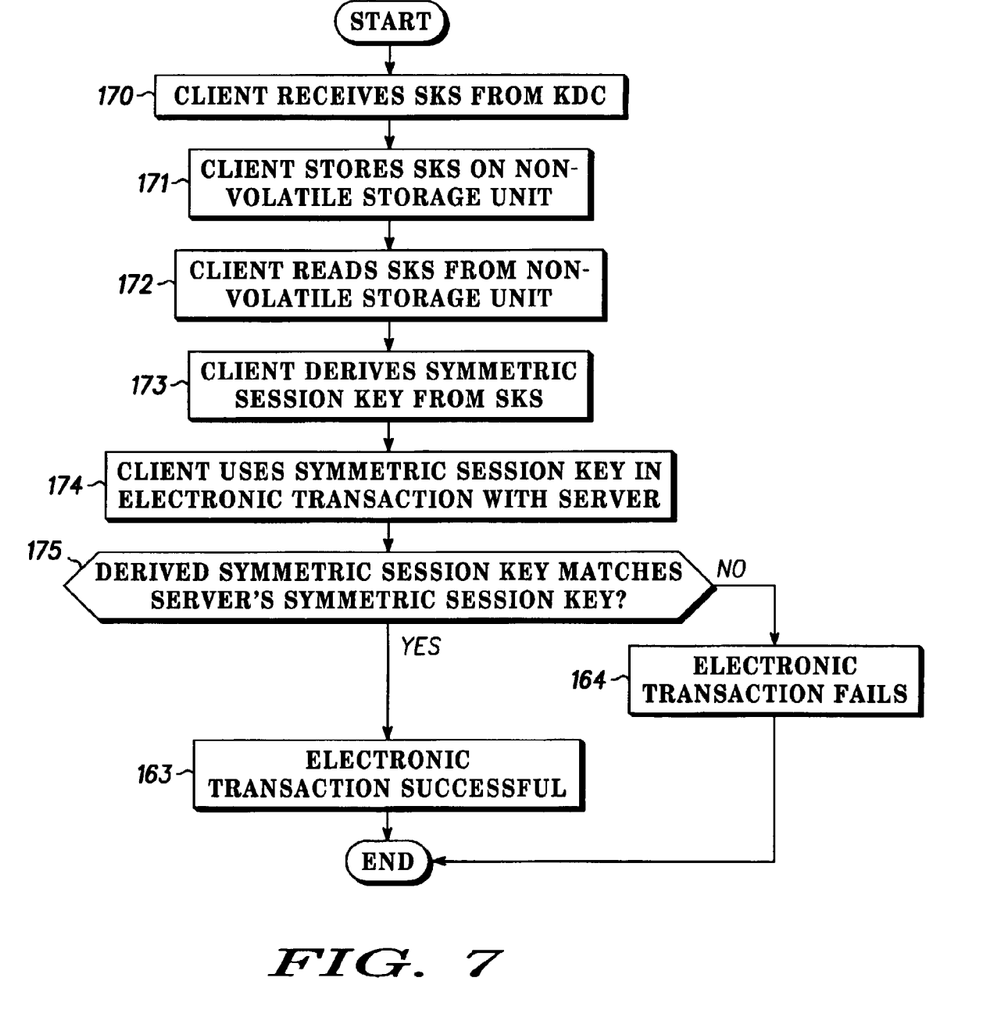
FIG. 7 is a flow chart illustrating an exemplary method of the present invention as applied to symmetric session cryptography.

FIG. 7 is a flow chart illustrating an exemplary method of the present invention as applied to symmetric session cryptography. More specifically, FIG. 7 illustrates a method whereby a client preferably receives, stores, and uses a symmetric session key seed (SKS) to generate a symmetric session key that can be used to make an electronic transaction. The client in this embodiment preferably generates a key that is identical to the key used by a server with which the client desires to make the electronic transaction.

As shown in FIG. 7, the process starts with a client receiving a SKS from a KDC or other source (170). Unlike the process used in public-key cryptography described in connection with FIG. 5, the client preferably does not generate the key seed that is to be used to generate a key. Instead, the KDC sends the SKS to the client.

After the client's host receives the SKS from the KDC, the host stores the SKS in a non-volatile storage unit (171). To make an electronic transaction, then, the client reads the SKS from the non-volatile storage unit (172) and derives a symmetric session key from the SKS (173) by running a one-way function on the host with the SKS and host ID as inputs to the function. The one-way function is preferably a program that is sent to the client by a KDC, server, or other source and is installed on the user's host.

The function can be called using a command found in the chosen key management protocol. A general command that generates a symmetric session key from a SKS is the following: "Symmetric Session Key=SKGen(Host ID, SKS)". However, the syntax of the function call command might vary depending on the chosen key management protocol. The function is preferably fast enough to regenerate the symmetric session key every time an electronic transaction requires the use of a symmetric session key.

The client can now preferably use the derived symmetric session key in an electronic transaction (174) with a server that also uses a symmetric session key. There are various possible methods of how the server obtains the same symmetric session key that the client uses. One method is for the KDC to execute the same one-way function that the host executes and generate the session key from the SKS. This method requires the KDC to have access to or a copy of the client's host ID. The KDC can then send the generated symmetric session key to the server. Alternatively, as is the case in the Kerberos protocol, the KDC can take the symmetric session key and encrypt it using a symmetric session key used by the server that is not known to any of the clients. This encrypted symmetric session key, along with the client and server identities and other related information, is called a ticket. The ticket can be then sent to the client's host. The host cannot modify the ticket because it does not know the server's symmetric session key. The client can then send this ticket to the server. The server then uses its key to decrypt the ticket and extract its copy of the session key.

Returning to FIG. 7, if the client's symmetric session key matches the symmetric session key used by the server (175) with which the client desires to complete an electronic transaction, the server and client can use the symmetric session keys to complete the electronic transaction (163). On the other hand, if the derived symmetric session key does not match the server's symmetric session key, the electronic transaction fails (164).

The preceding description has been presented only to illustrate and describe the invention. It is not intended to be exhaustive or to limit the invention to any precise form disclosed. Many modifications and variations are possible in light of the above teaching.

The preferred embodiment was chosen and described in order to best explain the principles of the invention and its practical application. The preceding description is intended to enable others skilled in the art to best utilize the invention in various embodiments and with various modifications as are suited to the particular use contemplated. It is intended that the scope of the invention be defined by the following claims.

What is claimed is:

1. A method of generating an electronic key used in an electronic transaction, said method comprising executing a first one-way function which is unique to a first host and installed on said first host that derives said electronic key from:
   a key seed received along with said first one-way function from a key distribution centre, said key seed and said first one-way function being saved in a non-volatile storage unit of said first host, and
   a unique host identification of said first host, said unique host identification not received from the key distribution centre;
   said function being executed to derive said electronic key each time an electronic transaction requiring the use of said electronic key is made.

2. The method of claim 1, further comprising executing said first one-way function with said saved key seed and said unique host identification as inputs to generate said electronic key used in said electronic transaction between said first host and an electronic device that uses a symmetric session key in said electronic transaction.

3. The method of claim 2, further comprising allowing a successful completion of said electronic transaction only if said electronic key matches said symmetric session key.

4. The method of claim 1, further comprising deleting said electronic key from said first host device following said transaction.

5. The method of claim 1, further comprising executing a second one-way function which is unique to a second host and installed on said second host that derives said electronic key from a key seed received along with said second one-way function from a key distribution centre, and saved in a non-volatile storage unit of said second host and a unique host identification of said second host, said function being executed to derive said electronic key each time an electronic transaction requiring the use of said electronic key is made.

6. A system for generating an electronic key used in an electronic transaction, said system comprising:
   a first host for making said electronic transaction, said first host having a unique host identification not received from a certifying authority for said electronic key;
   a non-volatile storage unit of said first host for storing a private key seed; and
   a first one-way function, unique to said first host and installed in said first host, for deriving said electronic key from said key seed and said host identification of said first host, said first host executing said one-way function to derive said electronic key each time an electronic transaction requiring the use of said electronic key is made.

7. The system of claim 6, wherein said first host randomly generates said private key seed.

8. The system of claim 7, wherein said one-way function derives a private key from said private key seed and said host identification.

9. The system of claim 8, wherein said first host derives a public key from said private key.

10. The system of claim 9, wherein said certifying authority registers said public key to produce a registered public key.

11. The system of claim 10, wherein said certifying authority comprises a key distribution center.

12. The system of claim 10, wherein said certifying authority saves said public key in a trusted database.

13. The system of claim 10, wherein said certifying authority sends a digital certificate to said first host attesting to the binding of said public key to said first host.

14. The system of claim 10, wherein said first host saves said private key seed in said non-volatile storage unit.

15. The system of claim 10, wherein said first host executes said one-way function to generate said private key used in said electronic transaction between said first host and an electronic device that uses said registered public key in said electronic transaction.

16. The system of claim 15, wherein said electronic transaction is successfully completed only if said private key correlates correctly with said public key.

17. The system of claim 6, wherein said key seed comprises a symmetric session key seed.

18. The system of claim 17, said system further comprising a key distribution center for sending said symmetric session key seed to said first host, said first host saving said symmetric session key seed in said non-volatile storage unit.

19. The system of claim 18, wherein said first host executes said first one-way function to generate said symmetric session key used in said electronic transaction between said first host and an electronic device, said electronic device also using a symmetric session key in said electronic transaction.

20. The system of claim 19, wherein said electronic transaction is completed successfully only if said symmetric session key used by said first host matches said symmetric session key used by said electronic device.

21. The system of claim 6 further comprising:
   a second host for making said electronic transaction, said second host having a unique host identification;
   a non-volatile storage unit of said second host for storing a private key seed; and
   a second one-way function unique to said second host, installed on said second host, for deriving said electronic key from said key seed and said host identification of said second host, said second host executing said one-way function to derive said electronic key each time an electronic transaction requiring the use of said electronic key is made.

* * * * *

UNITED STATES PATENT AND TRADEMARK OFFICE
CERTIFICATE OF CORRECTION

PATENT NO. : 7,352,867 B2  Page 1 of 1
APPLICATION NO. : 10/192920
DATED : April 1, 2008
INVENTOR(S) : Medvinsky It is certified that error appears in the above-identified patent and that said Letters Patent is hereby corrected as shown below:

ON THE FACE PAGE:
In Field (56), under "FOREIGN PATENT DOCUMENTS", in Column 2, Line 1:
Please delete "8/2001" and insert --5/2001--

COLUMN 5:
Line 28: Please delete "Thus" and insert --Thus,--

COLUMN 6:
Line 31: Please delete "unit. in" and insert --units. In--

Signed and Sealed this

Tenth Day of November, 2009

David J. Kappos
*Director of the United States Patent and Trademark Office*